(12) United States Patent
Buck et al.

(10) Patent No.: US 9,339,022 B2
(45) Date of Patent: May 17, 2016

(54) INJECTOR NOZZLE

(71) Applicants: Oliver Buck, Metzingen (DE); Thomas Schenk, Neuffen (DE)

(72) Inventors: Oliver Buck, Metzingen (DE); Thomas Schenk, Neuffen (DE)

(73) Assignee: LECHLER GMBH, Metzingen (DE)

( * ) Notice: Subject to any disclaimer, the term of this patent is extended or adjusted under 35 U.S.C. 154(b) by 0 days.

(21) Appl. No.: 14/565,971

(22) Filed: Dec. 10, 2014

(65) Prior Publication Data

US 2015/0157005 A1 Jun. 11, 2015

(30) Foreign Application Priority Data

Dec. 11, 2013 (DE) .................... 10 2013 225 612

(51) Int. Cl.
| | |
|---|---|
| *A62C 31/02* | (2006.01) |
| *B05B 1/00* | (2006.01) |
| *A01M 7/00* | (2006.01) |
| *B05B 7/04* | (2006.01) |
| *B05B 7/24* | (2006.01) |
| *B05B 15/00* | (2006.01) |

(52) U.S. Cl.
CPC .................. *A01M 7/005* (2013.01); *B05B 1/00* (2013.01); *B05B 7/0408* (2013.01); *B05B 7/2443* (2013.01); *B05B 15/001* (2013.01)

(58) Field of Classification Search
CPC .............. B05B 1/02; B05B 1/048; B05B 1/06
USPC ................ 239/589, 590.5, 597, 398
See application file for complete search history.

(56) References Cited

U.S. PATENT DOCUMENTS

| | | | |
|---|---|---|---|
| 4,799,622 A | 1/1989 | Ishikawa et al. | |
| 5,615,836 A | 4/1997 | Graef | |
| 6,042,089 A | 3/2000 | Klein | |
| 6,387,247 B1 | 5/2002 | Chen | |
| 6,736,960 B1 | 5/2004 | Chen et al. | |
| 7,669,780 B2* | 3/2010 | Sugano ..................... | B05B 5/00 |
| | | | 118/320 |

FOREIGN PATENT DOCUMENTS

| | | |
|---|---|---|
| DE | 43 38 585 A1 | 5/1995 |
| DE | 195 36 220 A1 | 4/1997 |
| DE | 101 29 402 A1 | 1/2003 |
| DE | 600 02 741 T2 | 3/2004 |

(Continued)

OTHER PUBLICATIONS

European Search Report of European Patent Office issued in Application No. 14 19 1625.4 with English translation of categories of cited documents dated Apr. 9, 2015 (6 pages).

(Continued)

*Primary Examiner* — Davis Hwu
(74) *Attorney, Agent, or Firm* — Flynn, Thiel, Boutell & Tanis, P.C.

(57) ABSTRACT

An injector nozzle for intake of liquids, including an injector chamber, a liquid inlet opening for an overpressured carrier liquid, the inlet opening issuing into the injector chamber, a liquid intake opening for a liquid to be drawn in, the intake opening issuing into the injector chamber, wherein downstream of the liquid inlet opening, the injector chamber has a first section conically enlarging in the flow direction and a second section conically enlarging in the flow direction, wherein the second conical section adjoins the first conical section and the second conical section has a greater cone angle than the first conical section.

19 Claims, 2 Drawing Sheets

(56) References Cited

FOREIGN PATENT DOCUMENTS

| | | | |
|---|---|---|---|
| GB | 613014 | A | 11/1948 |
| JP | 2012-202602 | A | 10/2012 |
| WO | WO 98/00227 | A1 | 1/1998 |

OTHER PUBLICATIONS

Office Action of German Patent Office issued in Application No. 10 2013 225 612.4 dated Aug. 26, 2014 (5 pages).

* cited by examiner

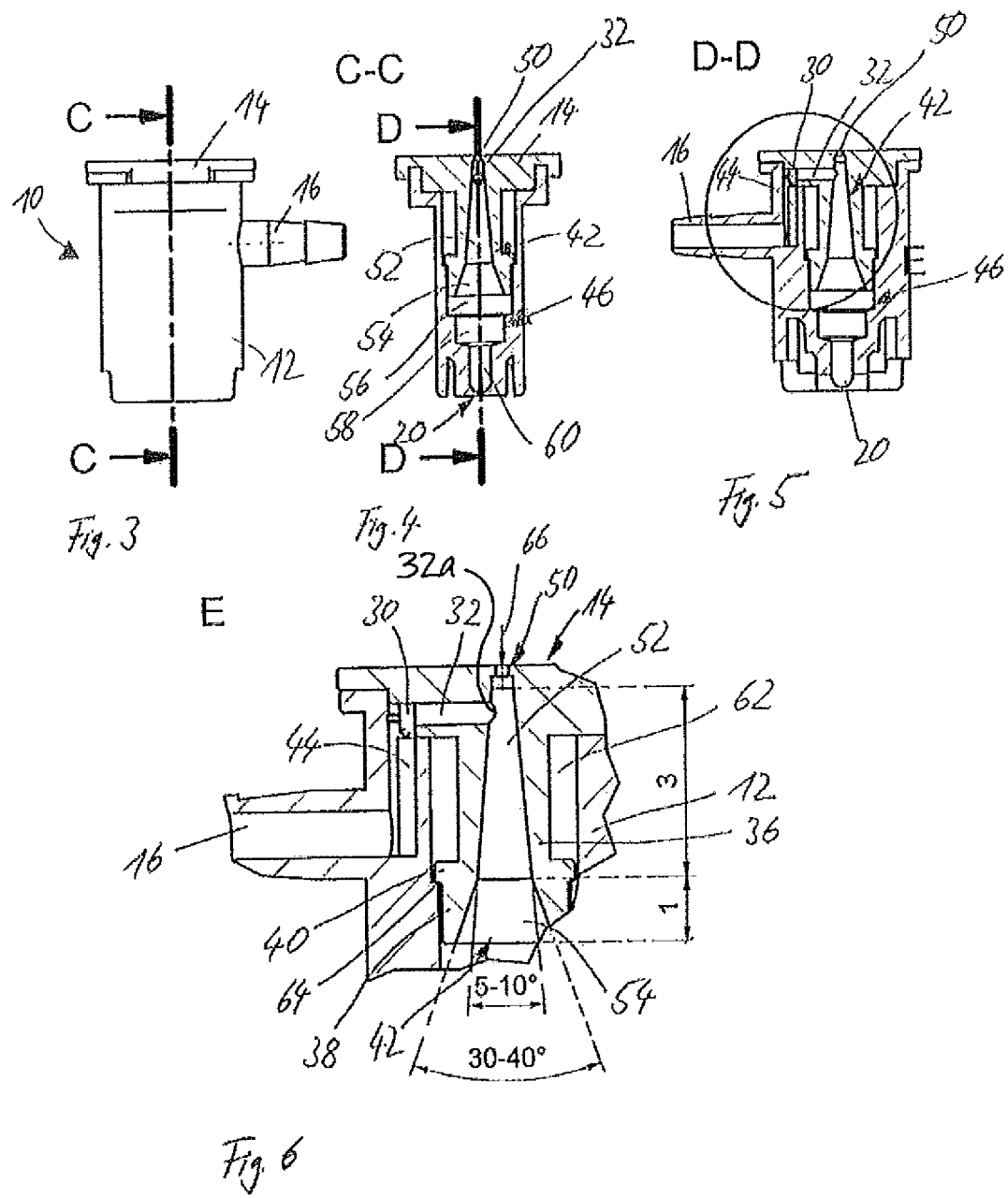

INJECTOR NOZZLE

CROSS-REFERENCE TO RELATED APPLICATIONS

This application claims the priority from German patent application DE 10 2013 225 612.4, the disclosure of which is hereby incorporated into this application.

FIELD AND SUMMARY OF THE INVENTION

The invention relates to an injector nozzle for intake or drawing in of liquids, comprising an injector chamber, a liquid inlet opening for an overpressured first liquid, the inlet opening issuing into the injector chamber, and a liquid intake opening for a liquid to be drawn in, the intake opening issuing into the injector chamber. The invention also relates to a sprayer device for pest management including an injector nozzle according to the invention.

Injector nozzles are well-known in general and operative according to the so-called Venturi effect. A liquid jet enters into an injector chamber, generates a low pressure within the injector chamber, and then entrains any gas or air present. The so-called water jet pump operates according to this principle.

In the field of pest management, conventional injector nozzles could not be employed to date, since the mixing ratio of intake liquid to carrier liquid is subject to severe variations as a function of pressure and the amount of carrier liquid, respectively. However, such a variation in the mixing ratio, even in case of only inadvertent pressure variability of the carrier liquid, prohibits use of conventional injector nozzles in agricultural technology.

An aim of the invention is to provide an injector nozzle for intake or drawing in of liquids, wherein even with varying pressure of the supplied first liquid an essentially constant mixing ratio between the first liquid and a liquid to be drawn in is achieved.

According to the invention, an injector nozzle for intake of liquids is provided, comprising an injector chamber, a liquid inlet opening for an overpressured first liquid, the inlet opening issuing into the injector chamber, and a liquid intake opening for a liquid to be drawn in, the intake opening issuing into the injector chamber, wherein the injector chamber starting from the liquid inlet opening has a first section conically enlarging in the flow direction and a second section conically enlarging in the flow direction, with the second conical section adjoining the first conical section and with the second conical section having a greater cone angle than the first conical section.

Surprisingly, the arrangement of two conical sections in the injector chamber such that the cone angle of the injector chamber enlarges, as viewed in the flow direction, allows an essentially constant mixing ratio between the first, overpressured liquid or the carrier liquid and the second, drawn in liquid to be achieved, even in case the pressure of the overpressured first liquid varies. Thereby, the injector nozzle according to the invention is appropriate for applications in pest management, and thus allows implementation of a pest management sprayer device, wherein the agricultural pesticide is fed in directly on the nozzle without additional injection pumps or the like. Therefore, the injector nozzle according to the invention allows construction of a very simple and reliably working sprayer device for pest management which, nonetheless, affords a constant mixing ratio. For example, the injector nozzle according to the invention can be employed with portable pest management sprayer devices, wherein the carrier liquid is pressurized using a hand pump. Upon draining the carrier liquid container during the spraying procedure, the pressure of the carrier liquid entering the injector chamber will also be reduced. However, the injector nozzle according to the invention allows an essentially constant mixing ratio between drawn in liquid and overpressured first liquid or carrier liquid to be maintained.

In an advanced embodiment of the invention, the first section has a cone angle to the central longitudinal axis of the injector chamber in a range between 5° and 10°.

Experiments revealed that such a dimensioning of the cone angle yields very positive results.

In an advanced embodiment of the invention, the second section has a cone angle to the central longitudinal axis of the injector chamber between 30° and 40°.

Such a cone angle of the second section equally provides for an essentially constant mixing ratio of carrier liquid to liquid to be drawn in. Therein, the cone angles of the first and the second sections are measured over the entire cross section of the cone. As measured to the central longitudinal axis of the injector chamber, the respective cone angle amounts to only half of the mentioned values.

In an advanced embodiment of the invention, in the flow direction, the first section has a length exhibiting between 2-fold and 4-fold, in particular 3-fold, the length of the second section.

Such a dimensioning of the lengths of the two conical sections provides for particularly constant mixing ratios, even with varying overpressure of the carrier liquid.

In an advanced embodiment of the invention, downstream of the injector chamber a mixing chamber is arranged.

In this manner, the drawn in liquid and the carrier liquid can be thoroughly admixed yet within the nozzle.

In an advanced embodiment of the invention, an outlet opening for an emitted spray jet runs out from the mixing chamber.

BRIEF DESCRIPTION OF THE DRAWINGS

Further features and advantages of the invention will become apparent from the following description of preferred embodiments of the invention in connection with the drawings. In that context, individual features of the different drawings can be combined in any arbitrary manner, without passing beyond the scope of the invention. In the drawings:

FIG. 3 shows a side view of the injector nozzle of FIG. 1;

FIG. 4 shows a view on the sectional plane C-C of FIG. 3;

FIG. 5 shows a view on the sectional plane D-D of FIG. 4; and

FIG. 6 shows an enlarged detail E of FIG. 5.

DETAILED DESCRIPTION

Figure 1:
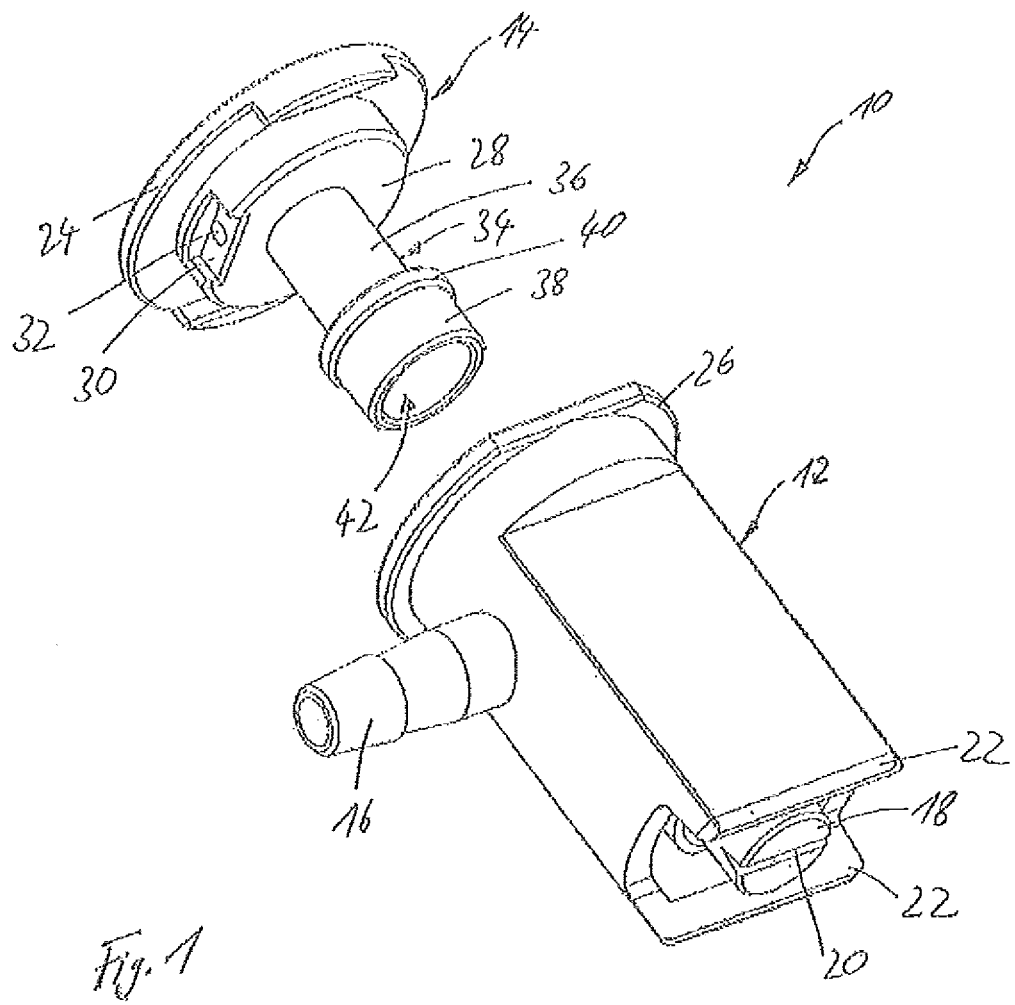
FIG. 1 shows an isometric, expanded illustration of the injector nozzle according to the invention according to a first embodiment.

In FIG. 1 an injector nozzle 10 according to the invention is illustrated in an expanded view. The injector nozzle has a housing 12 and an injector insert 14. The housing 12 has a one piece design, for example, is an injection molded part made of synthetic material, and has an intake port 16 on which a feed hose for liquid to be drawn in can be fitted. The housing 12 further includes a nozzle mouthpiece 18 with a slot-type outlet opening 20. By means of the slot-type outlet opening 20, the injector nozzle 10 is conceived to be a flat jet nozzle.

However, the shape and dimensions of the outlet opening 20 can be modified within the scope of the invention and, for example, the injector nozzle according to the invention can also be a full cone nozzle or a hollow cone nozzle.

The housing 12 has two lateral bars 22 which protrude beyond the nozzle mouthpiece 18 to a minor extent and, thus, shield said mouthpiece from damage.

The injector insert 14 has a closure plate 24 which can be placed onto a matching flange 26 on the housing 12 and provides a tight closing of the interior space of the housing 12, with the exception of an input opening for pressurized carrier liquid not visible in FIG. 1. A cylinder 28 goes out from the closure plate 24, the outer circumference of the cylinder being matched to the inner circumference of the housing 12 adjoining the flange 26. Thus, the cylinder 28 provides for an exact fit of the injector insert 14 in the housing 12. The cylinder 28 has an approximately rectangular recess 30 and an intake duct 32 goes out from said recess towards the injector chamber, not visible in FIG. 1, in the injector component 14. Via the recess 30 and the intake duct 32, liquid to be drawn in can be transferred from the interior of the housing 12 and, finally, from the connector adaptor 16 into the injector chamber.

A tubular adaptor 34 goes out from the cylinder 28 and has a smaller diameter in a first section 36 than in a second section 38 which constitutes the free end of the tubular adaptor 34. Between the two sections 36, 38, there is an annular flange 40 having an even larger diameter than the second section 38. The first section 36 does not contact liquid, but is intended to provide an essentially constant wall thickness of the injector insert 14. This feature is important in particular in case that the injector component 14 is an injection molded part made of synthetic material.

The circumferential annular flange 40 is configured to be a circumferential seal and provides for reliable sealing of a mixing and outlet chamber in the housing 12. The second section 38 provides an orifice into the mixing and outlet chamber in the housing 12.

In the illustration of FIG. 1 is an inlet opening or channel for an overpressured carrier liquid on the side of the closure plate 24 that is not visible in FIG. 1.

The carrier liquid is fed into the injector insert 14 in an overpressure condition, enters into the injector chamber 42 and produces a low pressure within the injector chamber 42, thus causing intake of liquid to be drawn in, for example pesticide, via the intake duct or channel 32. Then, the drawn in pesticide and the carrier liquid drain from the injector insert and enter into a mixing and outlet chamber in the housing 12. From the mixing and outlet chamber the mixture composed of drawn in liquid, especially pesticide, and carrier liquid exits via the outlet opening 20 in the form of a flat jet.

Figure 2:
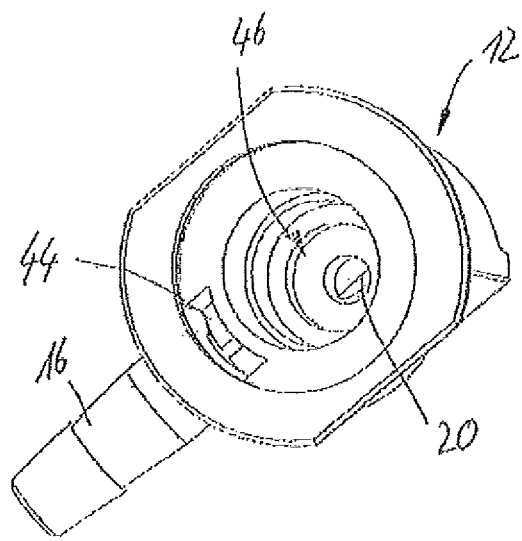
FIG. 2 shows an isometric illustration of a nozzle housing of the injector nozzle of FIG. 1 in a view obliquely from above.

The illustration of FIG. 2 shows the housing 12 in a view obliquely from above. Apparent is the intake port 16 issuing into a duct or channel 44 which, in the assembled condition of the injector nozzle 10, ends on the rectangular recess 30 in the cylinder 28 of the injector insert 14. Thus, pesticide is drawn in through the intake port 16, the duct 44, the recess 30, and the intake duct 32, and thereby enters into the injector chamber 42.

Illustrated in the interior of the housing 12 is the mixing and outlet chamber 46 passing over to the outlet opening 20.

The illustration of FIG. 3 shows a side view of the injector nozzle 10 together with the injector component 14 and the housing 12.

FIG. 4 shows a view on the sectional plane C-C of FIG. 3. Apparent is the inlet opening 50 for pressured liquid on the injector insert 14. Adjoining said inlet opening 50 is the injector chamber 42 which includes a first section 52 and a second section 54. Both the first section 52 and the second section 54 enlarge conically. Starting from the inlet opening 50, the injector chamber 42, thus, enlarges up to its end, where it passes over to the mixing and outlet chamber 46. In fact, the mixing and outlet chamber 46 has three sections, namely a first, cylindrical section 56 and, adjoining thereto, an equally cylindrical section 58 having a reduced diameter as compared to the first section 56. A third section 60 has a further significantly reduced diameter, as compared to the second section 58, and is equally cylindrical with a hemispheric lower end. In the hemispheric lower end of the third section 60, there the slot-type outlet opening 20 is provided. The cone angle of the first section 52 of the injector chamber 42 is smaller than the cone angle of the second section 54 of the injector chamber 42. The first section 52 of the injector chamber 42 is also longer than the second section 54.

The carrier liquid entering via the inlet opening 50 into the injector chamber 42 draws pesticide or, in general, liquid to be drawn in from the intake duct 32, so that a mixture composed of pesticide and carrier liquid is present in the injector chamber 42 and then also in the mixing chamber 46. In the course of movement through the injector chamber 42 and the mixing and outlet chamber 46, pesticide and carrier liquid are admixed thoroughly and then exit through the outlet opening 20 in the form of a mixture.

The illustration of FIG. 5 shows a view on the sectional plane D-D of FIG. 4. Pesticide is drawn into the injector chamber 42 via the connector adaptor 16, the duct 44, the recess 30, and the intake duct 32, and is therein admixed to the liquid entering through the inlet opening 50. Adjoining the injector chamber 42 is the mixing and outlet chamber 46 which then ends on the outlet opening 20.

The illustration of FIG. 6 shows a detail E of FIG. 5 in an enlarged view.

Apparent is an annular space 62 between an inner wall of the housing 12 and an outer wall of the section 36 of the injector insert 14. Said annular space 62 is not filled with liquid to be drawn in and is produced by the reduced wall thickness of the injector insert 14 in the vicinity of the section 36. In this manner, the wall thickness variability of the injector component 14 can be kept low, so that the component is producible with low tolerances using injection molding of synthetic material.

The annular flange 40 of the injector insert 14 provides an abutment stop for the injector insert 14 on a step 64 in the housing 12 and, thus, provides for exact positioning of the injector insert 14 in the housing 12. The second section 38 of the injector insert 14 is then resting on the inner wall of the housing 12. Thereby, the second section 38 seals the injector insert 14 and, thus, the mixing and outlet chamber 46 in the housing 12 in relation to the annular space 62 and also in relation to the flow path of the liquid to be drawn in.

In FIG. 6, the carrier liquid entering into the inlet opening 50 is symbolized by means of an arrow 66. It is apparent in FIG. 6 that the inlet opening 50 has two sections approximately equal in length, each in a circular cylindrical shape, wherein a diameter of a second section, in the flow direction, is greater than that of the first section. The first section 52 of the injector chamber 42 begins immediately downstream of the second section. The first section enlarges conically and can have a cone angle between 5° and 10°. The intake duct 32 issues into the injector chamber 42 at an intake opening 32a which is located a short length after the outset of the first conical section 52.

Adjoining the first section 52 is the second section 54 of the injector chamber 42. The second section can have a cone angle between 30° and 40°. As explained above, the second section 54 is shorter than the first section 52. Therein, the first section 52 can have between twice and four times the length of the second section 54. In the embodiment as illustrated, the first section 52 has three times the length of the second section 54.

Such a dimensioning of the lengths of the first section 52 and the second section 54 of the injector chamber 42 in conjunction with the angle ranges of the cone angles of the first section 52 and the second section 54, as illustrated in FIG. 6, yields an essentially constant mixing ratio during intake of pesticide using water for a carrier liquid. During test phases, the pressure of the carrier liquid was varied between 1 bar and 4 bar. A pesticide exhibiting a viscosity of about 22 mm$^2$/sec at 40° C. and a surface tension of 24.5 mN/m at 40° C. was employed in experiments. The pesticide was tested in a range between 10° C. environmental temperature and 30° C. environmental temperature. The mixing ratio remained essentially constant even at varying pressures of the carrier liquid between 1 bar and 4 bar.

Thus, the invention can provide an injector nozzle for drawing in of liquids, in particular for pest management, which is adapted to provide an essentially constant mixing ratio between drawn in liquid and carrier liquid even at varying pressure of the carrier liquid supplied in an overpressured condition.

The invention claimed is:

1. An injector nozzle for intake of liquids, comprising an injector chamber, a liquid inlet opening for receiving a pressurized first carrier liquid, the liquid inlet opening communicating with the injector chamber, a liquid intake opening for receiving a second liquid and drawing same into the injector nozzle, the liquid intake opening communicating with the injector chamber, wherein downstream of the liquid inlet opening, the injector chamber has a first conical section conically enlarging in the flow direction and a second conical section conically enlarging in the flow direction, wherein the second conical section adjoins and communicates with the first conical section, the second conical section being disposed downstream in the flow direction from the first conical section and having a greater cone angle than the first conical section, the liquid intake opening issuing directly into the first conical section of the injector chamber.

2. The injector nozzle according to claim 1, wherein the first conical section has a cone angle in a range between 5 degrees of angle and 10 degrees of angle.

3. The injector nozzle according to claim 1, wherein the second conical section has a cone angle between 30 degrees of angle and 40 degrees of angle.

4. The injector nozzle according to claim 1, wherein the first conical section in the flow direction has a length that is between two-fold and four-fold of a length of the second conical section.

5. The injector nozzle according to claim 1, further including a mixing and outlet chamber disposed downstream in the flow direction of the injector chamber.

6. The injector nozzle according to claim 5, further including an outlet opening for emitting a spray jet, the outlet opening extending outwardly from the mixing and outlet chamber.

7. A sprayer device for pest management, comprising at least one injector nozzle according to claim 1.

8. The injector nozzle according to claim 4, wherein the first conical section in the flow direction has a length which is three-fold of the length of the second conical section.

9. The injector nozzle according to claim 1, further including a housing in which the injector chamber, the liquid inlet opening and the liquid intake opening are disposed, the liquid inlet opening and the liquid intake opening both opening separately from one another through the housing to an exterior thereof.

10. The injector nozzle according to claim 9, wherein the housing includes a mixing chamber and an outlet both spaced downstream in the flow direction of the injector chamber, the mixing chamber communicating with the injector chamber such that the mixing chamber receives and mixes together the pressurized first carrier liquid and the second liquid therein, the mixing chamber additionally communicating with the outlet such that a mixture of the pressurized first carrier liquid and the second liquid is discharged from the mixing chamber and through the outlet.

11. The injector nozzle according to claim 9, wherein the injector chamber is disposed in the housing to receive therein both the pressurized first carrier liquid from the liquid inlet opening and the second liquid from the liquid intake opening.

12. An injector nozzle for discharging a mixture of first and second liquids, said injector nozzle comprising a housing including an injector chamber, a liquid inlet opening in fluid communication with said injector chamber and configured and disposed to receive a pressurized first carrier liquid, a liquid intake channel in fluid communication with said injector chamber and configured and disposed to draw into said injector chamber a second liquid, said injector chamber including a first conical section disposed downstream, with respect to a fluid flow direction through said injector nozzle, of said liquid inlet opening, said first conical section having a conical configuration which enlarges in the fluid flow direction, said liquid intake channel opening inwardly into said first conical section, said injector chamber further including a second conical section which enlarges in the fluid flow direction, said second conical section adjoining and being in fluid communication with said first conical section, said second conical section being disposed downstream, with respect to the fluid flow direction, of said first conical section, and said second conical section having a greater cone angle than a cone angle of said first conical section.

13. The injector nozzle according to claim 12, wherein said liquid inlet opening and said liquid intake channel both open separately from one another through said housing to an exterior thereof.

14. The injector nozzle according to claim 12, wherein said injector chamber is disposed in said housing to receive therein both the pressurized first carrier liquid from said liquid inlet opening and the second liquid from said liquid intake channel.

15. The injector nozzle according to claim 14, wherein said housing includes a mixing chamber and an outlet both spaced downstream, with respect to the fluid flow direction, of said injector chamber, said mixing chamber communicating with said injector chamber such that said mixing chamber receives and mixes together the pressurized first carrier liquid and the second liquid therein, said mixing chamber additionally communicating with said outlet such that a mixture of the pressurized first carrier liquid and the second liquid is discharged from said mixing chamber and through said outlet.

16. An injector nozzle for discharging a mixture of first and second liquids, said injector nozzle comprising a housing, an injector chamber disposed in said housing, a liquid inlet channel disposed in said housing and configured to receive a pressurized first carrier liquid and to direct same into said injector chamber, a liquid intake channel disposed in said housing and configured to draw into said injector chamber a second liquid, said liquid inlet channel and said liquid intake channel both opening outwardly through said housing separately from one another, said injector chamber including a first conical section disposed downstream, with respect to a fluid flow direction through said injector nozzle, of said liquid inlet channel, said first conical section having a conical configuration which enlarges in the fluid flow direction, said injector chamber further including a second conical section having a conical configuration which enlarges in the fluid flow direction, said second conical section adjoining and being in fluid communication with said first conical section, and said second conical section having a greater cone angle than a cone angle of said first conical section.

17. The injector nozzle according to claim 16, wherein said liquid intake channel opens inwardly into said first conical section, and said second conical section is disposed downstream, with respect to the fluid flow direction, of said first conical section.

18. The injector nozzle according to claim 16, wherein said injector chamber is disposed in said housing to receive therein both the pressurized first carrier liquid from said liquid inlet channel and the second liquid from said liquid intake channel.

19. The injector nozzle according to claim 18, wherein said housing includes a mixing chamber and an outlet both spaced downstream, with respect to the fluid flow direction, of said injector chamber, said mixing chamber communicating with said injector chamber such that said mixing chamber receives and mixes together the pressurized first carrier liquid and the second liquid therein, said mixing chamber additionally communicating with said outlet such that a mixture of the pressurized first carrier liquid and the second liquid is discharged from said mixing chamber and through said outlet.

* * * * *